June 19, 1934.  F. G. SHOEMAKER  1,963,423
CONNECTING ROD DESIGN FOR RADIAL ENGINES
Filed May 3, 1933  2 Sheets-Sheet 1
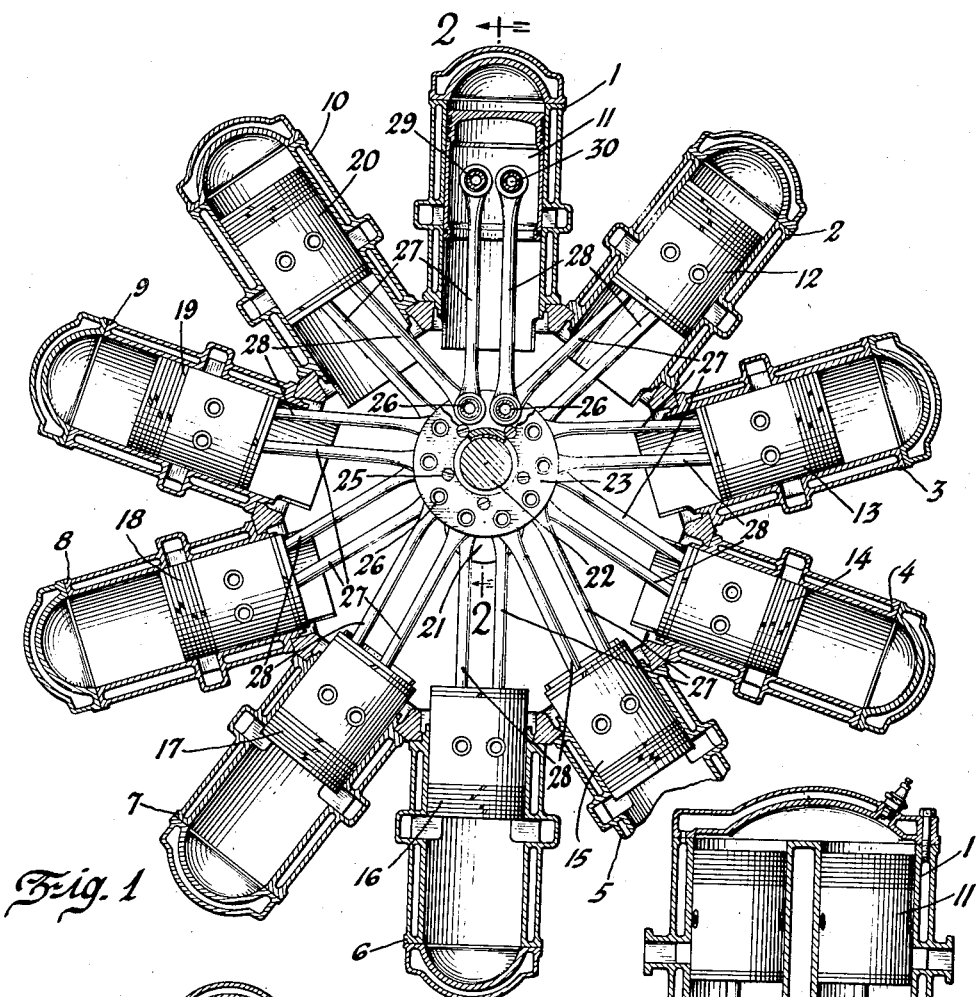
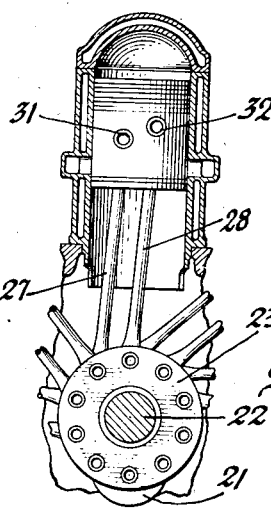
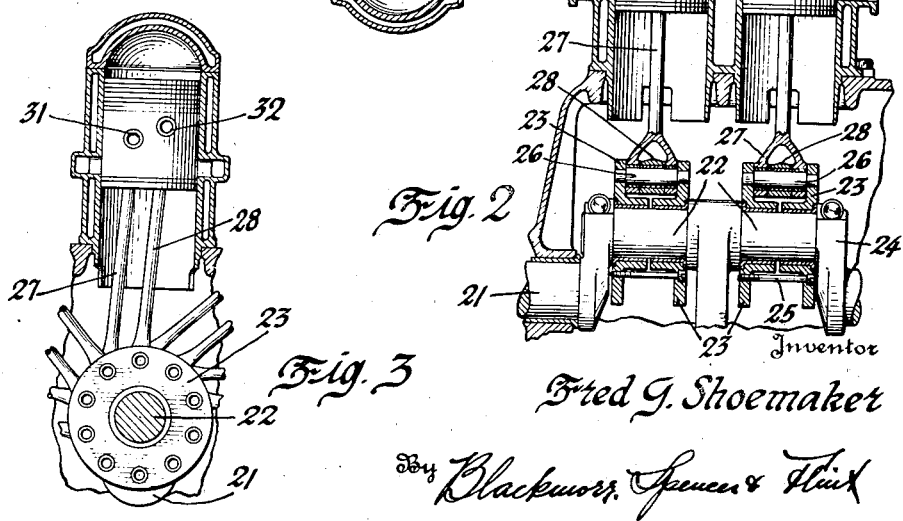
Inventor
Fred G. Shoemaker
By Blackmore, Spencer & Flint
Attorneys June 19, 1934.     F. G. SHOEMAKER     1,963,423
CONNECTING ROD DESIGN FOR RADIAL ENGINES
Filed May 3, 1933      2 Sheets-Sheet 2

Inventor
Fred G. Shoemaker
By Blackmore, Spencer & Hunt
Attorneys

Patented June 19, 1934

1,963,423

UNITED STATES PATENT OFFICE 1,963,423

CONNECTING ROD DESIGN FOR RADIAL ENGINES

Fred G. Shoemaker, Ferndale, Mich., assignor to General Motors Research Corporation, Detroit, Mich., a corporation of Delaware Application May 3, 1933, Serial No. 669,079

5 Claims. (Cl. 121—120)

This invention relates to a connecting rod system for converting the rectilinear motion of an engine piston into the rotary movement of a crank shaft, and it is particularly applicable to engines in which a plurality of cylinders disposed in different planes radial to the axis of the crank shaft have pistons and connecting rods connected to a single crank pin cluster bearing common to them such as V or radial type engines.

In the conventional connecting rod arrangement with a master connecting rod to one piston and link rods to the remaining pistons, the motions of the pistons, their side thrust against their cylinder walls and the torques which they deliver to the crank shaft are not identical. While these differences and their effects may be modified in various ways such as by reducing the compression of that particular cylinder in which the piston connected to the master rod works, by shortening the master rod, by modifying its stroke, or by changing the valve timing of the various cylinders, it is difficult fully to correct for the differences and secure proper balance and even torque.

The object of the invention is a connecting rod arrangement between the pistons of a multi-cylinder radial engine and their common cluster bearing on a common crank pin of a crank shaft, such that each piston will have identical connections with the cluster bearing and in which the motions of the pistons, their side thrust against the cylinder walls and the torques which they deliver to the crank shaft will be identical.

It is a further object of the invention to reduce the resultant turning moment on the cluster bearing and hence the side thrust against the cylinder walls.

According to the invention each piston is provided with two connecting rods of equal length spaced parallel to each other in different parallel planes parallel to the crank shaft axis. Each of the two connecting rods for each piston has its own bearing or piston pin in the piston and a bearing or link pin on the cluster bearing. The construction is such that throughout the operating movement, a line between any two points on the cluster bearing always maintains the same angular relationship to a line between any two points on the piston, and the cluster bearing has a plain motion of translation except in the dead center position of each piston the lines of action of the forces through the connecting rods of each piston have a resultant moment on the cluster bearing about the axis of the crankpin. This turning moment tends to turn the cluster bearing around the crankpin without doing any work on the crank shaft.

Any forces tending to turn the cluster bearing around the crankpin result in an upward force in one of the two parallel connecting rods of each piston and a downward force in the other tending to twist or cock each piston in its cylinder about an axis between the piston pins and parallel with the crankpin axis.

Since each piston is provided with identical connections to the cluster bearing consisting of a pair of parallel connecting rods, the algebraic sum of the turning moments of all the connecting rods is resisted by a cocking load on the piston of each cylinder divided among them in the ratio of the angularity of their connecting rods. It thus follows that each cylinder in turn, in each engine cycle, bears an equal share in resisting the total resultant turning moment about the crank pin axis, of all the forces acting on the cluster bearing.

The engine is in balance, the wear to which each cylinder is subjected as a result of side thrust due to the angularity of the connecting rods is identical for each cylinder, and each cylinder plays its part in resisting the algebraic sum of the turning moments about the crankpin axis of all the forces acting on the cluster bearing.

The turning moments of the forces acting through the connecting rods and tending to turn the cluster bearing about the crank pin axis may be reduced by placing one piston pin of each piston slightly higher in the piston than the other and thus in effect causing the resultant line of action of the two connecting rods to pass closer to the crank pin axis when they are on their power stroke and correspondingly farther away from the axis on the compression stroke. That piston pin is highest which is on that side of the piston towards which the crank shaft turns, all as will be later described.

The drawings show the application of the invention to a ten cylinder, radial, U-type two-cycle internal combustion engine in which each cylinder so called, consists of two cylinder barrels having a common combustion chamber both lying in the same radial plane parallel with the crankshaft. In this way there are two banks of cylinder barrels in planes transverse to the crankshaft, each cylinder barrel in one plane being complementary to its corresponding cylinder barrel in the other plane. All the pistons in a bank of cylinders are connected to a common crank pin cluster bearing. The crank pin of one bank may be offset from the crank pin of the other bank in known manner in order to give the pistons of one bank a slight lead over the pistons of the other bank.

In the drawings:

Figure 1 is a sectional elevation through one bank of cylinder barrels complete with pistons, crank pin and connecting rods according to the invention.

Figure 2 is a section on line 2—2 of Figure 1.

Figure 3 is a part section showing a modified form of the invention.

Figure 5:
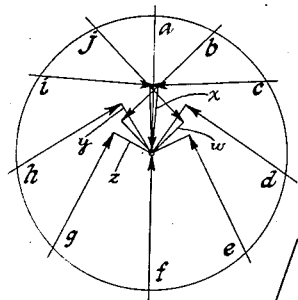
Figure 5 is an enlarged diagrammatic view of a part of Figure 4 more clearly showing the moment arms of the forces of Figure 4.

The cylinder barrels 1 to 10 with pistons 11 to 20, respectively, are arranged radially and equally spaced 36° apart around a crank shaft 21 having a crank pin 22. On the crank pin 22 is a cluster bearing 23 with connecting rods to each piston 11 to 20. The crank pin 22 is forged separately from the cheeks 24 of the crank shaft 21 and is suitably held therein.

The cluster bearing is made in two halves held together by studs 25. Link pins 26 suitably held in the two halves of the cluster bearing form pivot axes for the parallel connecting rods 27 and 28 of each piston. These link pins are arranged in a circle concentric with the axis of the crank pin and since it is convenient to make each link pin common to the adjacent link rods of adjacent cylinder barrels of the bank of cylinder barrels, there are ten link pins spaced an angular distance apart equal to the angular distance between cylinder barrels.

As shown, one of the two adjacent link rods of adjacent cylinders is forked and straddles the other. In Figure 2 the link rod 27 of piston 11 straddles the link rod 28 of piston 20.

The angular pitch of the pairs of link pins for adjacent pistons must always be equal to the angle between adjacent pistons.

Figure 4:
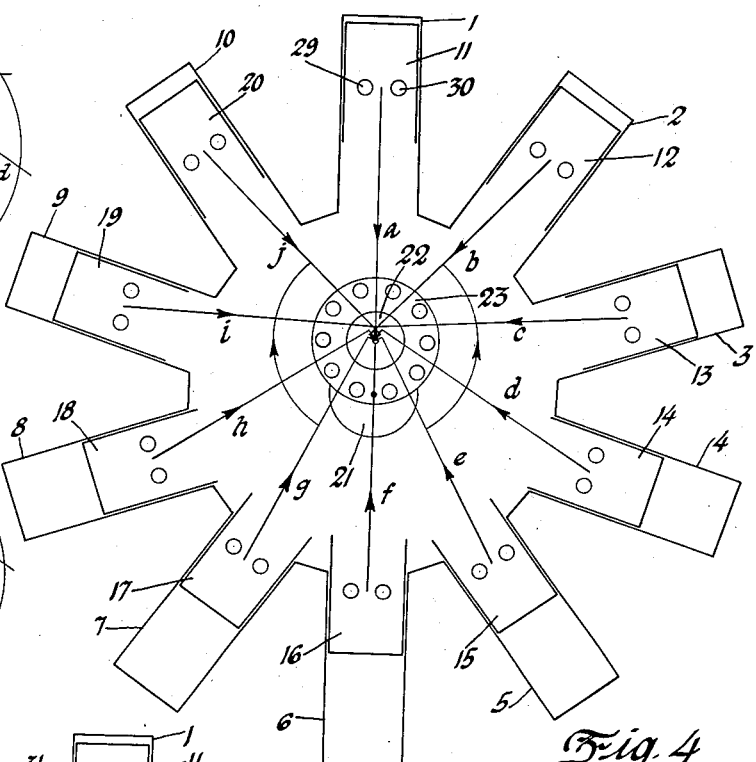
Figure 4 is a diagrammatic view showing the instantaneous turning moments to which the cluster bearing, in the position according to the arrangement of Figure 1, is subjected.
Figure 8:
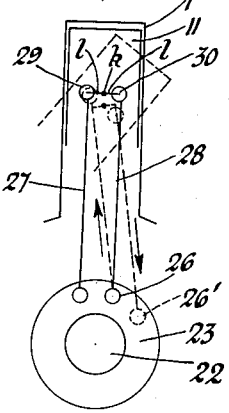
Figure 8 is a diagrammatic view showing how any forces tending to turn the cluster bearing around the crank pin result in an upward force in one of the two parallel connecting rods of each piston and a downward force in the other, tending to twist or cock each piston in its cylinder about an axis between the piston pins and parallel with the crank pin axis.

Referring now to Figures 1, 4, and 8, the piston pins 29 and 30 for the connecting rods 27 and 28 of each piston are spaced apart in a plane normal to the cylinder axis—a distance between centers equal to the distance between centers of the link pins of their connecting rods.

In the modification according to Figures 3 and 4, the cluster bearing with its connecting rods may be considered as having been turned through a small angle about the axis of the crank pin from the position shown in Figure 1 without having moved the pistons or the crank pin, and to fit this condition the piston pins 31 and 32 must be spaced apart in a plane at an angle to a plane normal to the cylinder axis equal to the angle through which the cluster bearing has been turned.

Assuming now the crank shaft to be turning clockwise in Figures 1, 3, 4, 5, 6, and 7, the pistons to the left of the vertical center line are on their power strokes and those to the right are on their compression strokes. In Figures 1, 4, and 5, the moment arms of the connecting rods of opposite pistons 20 and 12, 19 and 13, 18 and 14, 17 and 15 on the cluster bearing, about the crank pin axis are equal. The forces on the connecting rods of the pistons 20, 19, 18, and 17 which are on their power stroke are greater than those on the connecting rods of the pistons 12, 13, 14, and 15 which are on their compression stroke, so that while the turning moments of the former are in opposition to those of the latter there is a resultant turning moment on the cluster bearing tending to turn it clockwise around the crank pin.

Figure 7:
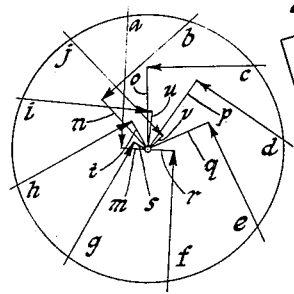
Figure 7 is an enlarged diagrammatic view of a part of Figure 6, more clearly showing the moment arms of the forces of Figure 6.
Figure 6:
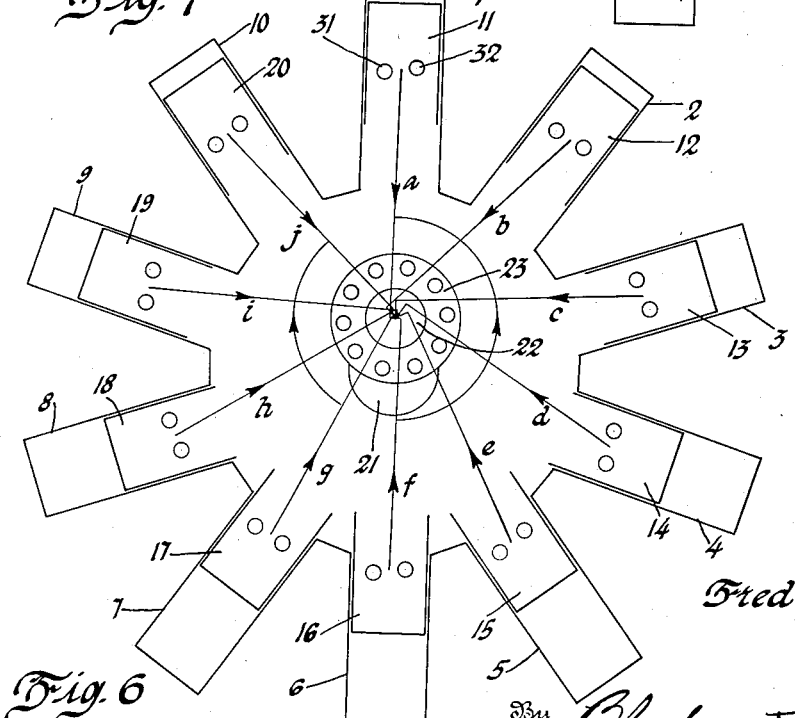
Figure 6 is a diagrammatic view showing the instantaneous turning moments to which the cluster bearing, in the position according to the arrangement of Figure 3, is subjected.

By turning the cluster bearing and its link pins backwards or anti-clockwise through a suitable small angle relatively to the pistons and the crank pin as shown in Figures 3, 6, and 7, dead center occurs before the connecting rods are radial to the axis of the crank shaft, and the resultant line of action of the two connecting rods of each piston on its power stroke may be made to pass closer to the crank pin axis than the resultant line of action of the two connecting rods of each piston on its compression stroke except in its dead center position. The resultant turning moment on the cluster bearing can thereby be reduced and it is possible to select an angularity such that at one particular engine load condition the resultant turning moment will be zero.

Referring now particularly to the diagrammatic Figures 4, 5, 6, and 7, the resultant gas pressure forces acting through the piston and connecting rods on the cluster bearing 23 are represented in direction but not in magnitude by the lines $a$, $b$, $c$, $d$, $e$, $f$, $g$, $h$, $i$, $j$, respectively.

In Figures 4 and 5 the resultant gas pressure forces $j$ and $b$, $i$ and $c$, $h$ and $d$, $g$ and $e$ of opposite pistons have equal moment arms $w$, $x$, $y$, $z$, respectively, about the crank pin axis. The forces represented in direction by the lines $j$, $i$, $h$, $g$, have a turning moment tending to turn the cluster bearing 23 clockwise about the crank pin axis, while those represented in direction by the lines $b$, $c$, $d$, $e$, have a turning moment tending to turn the cluster bearing 23 counterclockwise about the crank pin axis. The forces represented in direction by the lines $a$ and $f$ have no turning moment on the cluster bearing. Allotting the sign $+$ to the turning moments which are clockwise and the sign $-$ to those which are counterclockwise, the algebraic sum of these turning movements equals $$+(jw+ix+hy+gz)-(bw+cx+dy+ez).$$

Since the compression forces $b$ $c$ $d$ $e$ are less than the explosion forces $j$ $i$ $h$ $g$ and their moment arms are respectively equal, there is a net resultant turning moment on the cluster bearing tending to turn it in a counterclockwise direction.

In Figures 6 and 7 the resultant gas pressure forces $a$ $b$ $c$ $d$ $e$ $f$ $g$ $h$ $i$ $j$ have moment arms $m$, $n$, $o$, $p$, $q$, $r$, $s$, $t$, $u$, $v$, respectively about the crank pin axis. The forces represented in direction by the lines $j$, $i$, $h$, $g$, have a turning moment tending to turn the cluster bearing 23 clockwise about the crank pin axis, while those represented by the lines $a$ $b$ $c$ $d$ $e$ $f$ have a turning moment tending to turn the cluster bearing 23 counterclockwise. Allotting the sign $+$ to the turning moments which are clockwise and the sign $-$ to those which are counterclockwise, the algebraic sum of the turning moments equals $$+(jv+iu+ht+gs)-(am+bn+co+dp+eq+fr).$$

The forces $j$, $i$, $h$, $g$, are the greater but have the lesser moment arms and it is possible to select conditions in which the resultant turning moment will be zero.

In Figure 8 is shown a diagrammatic representation of the cocking loads on the piston resulting from a turning moment on the cluster bearing tending to turn the link pin 26 clockwise into a position 26' with a change in the position of the connecting rods 27 and 28 and their piston pins 29 and 30 with the piston 11 into the positions shown by the broken lines. There results therefrom an upward force in the rod 27 and a downward force in the rod 28, constituting a "couple" having moments about a point $k$ midway between the piston pins 29 and 30 with moment arms 1 which in each cycle are of a maximum length at the instantaneous position when the connecting rods are parallel with their cylinder axis, and less than the maximum at other instantaneous positions to an extent depending on the "angularity" of the connecting rods.

I claim:

1. In combination a crankshaft, a plurality of cylinders radiating from the axis of the crankshaft in different radial planes, a piston in each cylinder, a crank pin on the crankshaft, a cluster bearing on the crank pin and parallel connecting rods of equal length—spaced from each other in different parallel planes parallel to the crank shaft axis between each piston and the cluster bearing whereby the motion of each piston and connecting rods relative to the crankshaft or its cylinders will be identical with that of all the other pistons and their connecting rods, and each cylinder will in its turn, in each engine cycle, bear an equal part in resisting the resultant turning moment about the crankpin axis, of all the forces acting on the cluster bearing.

2. The combination according to claim 1 in which the parallel connecting rods for each piston have their own individual bearing in the piston and on the cluster bearing such that the line of centers of the bearings in the piston is not normal to the line of action of the piston.

3. The combination according to claim 1 in which each piston has a pair of parallel connecting rods, one end of each connecting rod having its own bearing in its piston and the other end having a bearing on the cluster bearing common to the adjacent connecting rod of an adjacent cylinder.

4. In combination, a crank shaft, a plurality of cylinders radiating from the axis of the crank shaft in different radial planes, a piston in each cylinder, a crank pin on the crank shaft, a cluster bearing on the crank pin and parallel connecting rods of equal length—spaced from each other in different parallel planes parallel to the crank shaft axis—between each piston and the cluster bearing whereby the total turning moment of all the forces acting on the cluster bearing through the connecting rods of each piston is resisted by an equal force, equally divided and distributed in turn, in each engine cycle, among all the cylinder bores, through a cocking load on each piston.

5. The combination according to claim 1 in which the cluster bearing on the crank pin consists of two ring shaped halves with bearings for the connecting rods clamped therebetween.

FRED G. SHOEMAKER.